US012412516B2

(12) United States Patent
Yao et al.

(10) Patent No.: US 12,412,516 B2
(45) Date of Patent: Sep. 9, 2025

(54) DISPLAY PANEL, METHOD FOR DRIVING DISPLAY PANEL, AND DISPLAY APPARATUS

(71) Applicant: Hefei Visionox Technology Co., Ltd., Anhui (CN)

(72) Inventors: Yuan Yao, Hefei (CN); Chung-Chun Lee, Hefei (CN); Yiming Xiao, Hefei (CN); Yunjie Liu, Hefei (CN); Zengqiang Xia, Hefei (CN); Yongqiang Du, Hefei (CN)

(73) Assignee: Hefei Visionox Technology Co., Ltd., Hefei (CN)

( * ) Notice: Subject to any disclaimer, the term of this patent is extended or adjusted under 35 U.S.C. 154(b) by 0 days.

(21) Appl. No.: 18/663,377

(22) Filed: May 14, 2024

(65) Prior Publication Data

US 2024/0420624 A1 Dec. 19, 2024

Related U.S. Application Data

(63) Continuation of application No. PCT/CN2024/077353, filed on Feb. 18, 2024.

(30) Foreign Application Priority Data

Jun. 16, 2023 (CN) ......................... 202310731471.9

(51) Int. Cl.
*G09G 3/32* (2016.01)

(52) U.S. Cl.
CPC ....... *G09G 3/32* (2013.01); *G09G 2300/0426* (2013.01); *G09G 2310/0275* (2013.01);
(Continued)

(58) Field of Classification Search
CPC ....... G09G 3/32–3291; G09G 2300/02; G09G 2300/026; G09G 2300/0426;
(Continued)

(56) References Cited

U.S. PATENT DOCUMENTS

2016/0125791 A1* 5/2016 Park ..................... G09G 3/3208 345/76
2019/0130835 A1 5/2019 Ka et al.
(Continued)

FOREIGN PATENT DOCUMENTS

CN 108206009 A 6/2018
CN 111710239 A 9/2020
(Continued)

OTHER PUBLICATIONS

Search Report issued on May 22, 2024, in corresponding International Application No. PCT/CN2024/077353, 13 pages.

*Primary Examiner* — Nathan Danielsen
(74) *Attorney, Agent, or Firm* — Maier & Maier, PLLC

(57) ABSTRACT

A display panel, a method for driving a display panel, and a display apparatus. The display panel includes at least two partitions, at least two first power supply voltage signal lines, and at least two first initialization signal lines, each of the partitions includes at least one sub-pixel, and the sub-pixel includes a light-emitting element; and the first initialization signal lines connected to first electrodes of light-emitting elements in at least two of the partitions are different, second electrodes of the light-emitting elements in at least two of the partitions are insulated from each other, the first power supply voltage signal lines connected to the second electrodes of the light-emitting elements in at least two of the partitions are different, the first initialization signal line is configured to transmit a first initialization signal for initializing the first electrode of the light-emitting element.

20 Claims, 8 Drawing Sheets

(52) U.S. Cl.
CPC ............... *G09G 2320/0233* (2013.01); *G09G 2320/062* (2013.01); *G09G 2330/021* (2013.01)

(58) Field of Classification Search
CPC ..... G09G 2300/043; G09G 2310/0243; G09G 2310/0275; G09G 2310/04; G09G 2310/06–063; G09G 2310/08; G09G 2320/0233; G09G 2320/0242; G09G 2320/04; G09G 2320/043; G09G 2320/045; G09G 2320/062; G09G 2320/0686; G09G 2320/0693; G09G 2330/021; G09G 2330/028; G09G 2330/10
See application file for complete search history.

(56) References Cited

U.S. PATENT DOCUMENTS

| | | | | |
|---|---|---|---|---|
| 2021/0358393 | A1* | 11/2021 | Kang ....................... | G09G 3/32 |
| 2023/0108203 | A1 | 4/2023 | Hai | |
| 2023/0260456 | A1* | 8/2023 | Yang .................... | G09G 3/3233 345/211 |

FOREIGN PATENT DOCUMENTS

| | | | |
|---|---|---|---|
| CN | 111968578 | A | 11/2020 |
| CN | 113540172 | A | 10/2021 |
| CN | 114664259 | A | 6/2022 |
| CN | 112017604 | B | 7/2022 |
| CN | 114743505 | A | 7/2022 |
| CN | 114207860 | B | 11/2022 |
| CN | 115835704 | A | 3/2023 |
| KR | 1020170078916 | A1 | 7/2017 |

* cited by examiner

DISPLAY PANEL, METHOD FOR DRIVING DISPLAY PANEL, AND DISPLAY APPARATUS

CROSS-REFERENCE TO RELATED APPLICATION

The present application is a continuation application of International Application No. PCT/CN2024/077353, filed on Feb. 18, 2024, which claims priority to Chinese Patent Application No. 202310731471.9 filed on Jun. 16, 2023, both of which are incorporated herein by reference in their entireties.

TECHNICAL FIELD

The present application relates to the field of display technology, and particularly to a display panel, a method for driving a display panel, and a display apparatus.

BACKGROUND

With the continuous development of display technology, display panels are more and more widely applied, and user's demand for the display panels is greater and greater. The inventors of the present application have found that, at present, the initial cross-voltage value of the light-emitting elements in different areas of some display panels varies greatly, resulting in relatively great brightness difference in the different areas.

SUMMARY

Embodiments of the present application provide a display panel, a method for driving a display panel, and a display apparatus, in which the first initialization signal lines in different partitions can be arranged independently, which is beneficial for reducing the initial cross-voltage value difference and the brightness difference for the light-emitting elements in different partitions.

In a first aspect, some embodiments of the present application provide a display panel including at least two partitions, at least two first power supply voltage signal lines, and at least two first initialization signal lines, each of the partitions includes at least one sub-pixel, and the sub-pixel includes a light-emitting element; and the first initialization signal lines connected to first electrodes of light-emitting elements in at least two of the partitions are different, second electrodes of the light-emitting elements in at least two of the partitions are insulated from each other, the first power supply voltage signal lines connected to the second electrodes of the light-emitting elements in at least two of the partitions are different, the first initialization signal line is configured to transmit a first initialization signal for initializing the first electrode of the light-emitting element, and the first power supply voltage signal line is configured to transmit a first power supply voltage signal.

In a second aspect, some embodiments of the present application provide a method for driving a display panel applicable to the display panel according to the first aspect, and the method includes: providing different first initialization signals to the first electrodes of the light-emitting elements in at least two of the partitions through at least two first initialization signal lines; and providing different first power supply voltage signals to the second electrodes of the light-emitting elements in at least two of the partitions through at least two first power supply voltage signal lines.

In a third aspect, some embodiments of the present application provide a driving module electrically connected to the display panel according to the first aspect, and the driving module includes: an acquisition unit configured to acquire, for any i-th partition in the display panel, a voltage value of the first power supply voltage signal provided to the i-th partition and a preset initial cross-voltage value, and i being a positive integer; a calculation unit configured to determine, according to the voltage value of the first power supply voltage signal corresponding to the i-th partition and the preset initial cross-voltage value, a voltage value of the first initialization signal transmitted by the first initialization signal line correspondingly connected to the i-th partition, and the initial cross-voltage value being a voltage difference between the voltage value of the first initialization signal and the voltage value of the first power supply voltage signal; and an output unit configured to provide, based on the determined voltage value of the first initialization signal transmitted by the first initialization signal line correspondingly connected to the i-th partition, the first initialization signal with the determined voltage value to the first initialization signal line correspondingly connected to the i-th partition.

In a fourth aspect, some embodiments of the present application provide a display apparatus including the display panel according to the first aspect or the driving module according to the third aspect.

In the display panel, the method for driving a display panel, and the display apparatus according to the embodiments of the present application, the display panel includes at least two partitions, at least two first power supply voltage signal lines, and at least two first initialization signal lines, each of the partitions includes at least one sub-pixel, and the sub-pixel includes the light-emitting element; and the first initialization signal lines connected to the first electrodes of the light-emitting elements in at least two of the partitions are different, the second electrodes of the light-emitting elements in at least two of the partitions are insulated from each other, the first power supply voltage signal lines connected to the second electrodes of the light-emitting elements in at least two of the partitions are different, the first initialization signal line is configured to transmit the first initialization signal for initializing the first electrode of the light-emitting element, and the first power supply voltage signal line is configured to transmit the first power supply voltage signal. In the embodiments of the present application, both the first initialization signal line and the first power supply voltage signal line are arranged independently for the partitions, so that the first initialization signal lines in different partitions are set independently, and an appropriate initial cross-voltage value for the light-emitting element in each partition can be obtained according to the change in the first power supply voltage signal transmitted by the first power supply voltage signal line, which is beneficial for reducing the initial cross-voltage value difference and the brightness difference for the light-emitting elements in different partitions.

BRIEF DESCRIPTION OF THE DRAWINGS

In order to more clearly illustrate the technical solutions of the embodiments of the present application, the drawings to be used in the embodiments of the present application will be briefly introduced below. For those of ordinary skill in the art, other drawings can be obtained based on these drawings without inventive effort.

DETAILED DESCRIPTION

Figure 1:
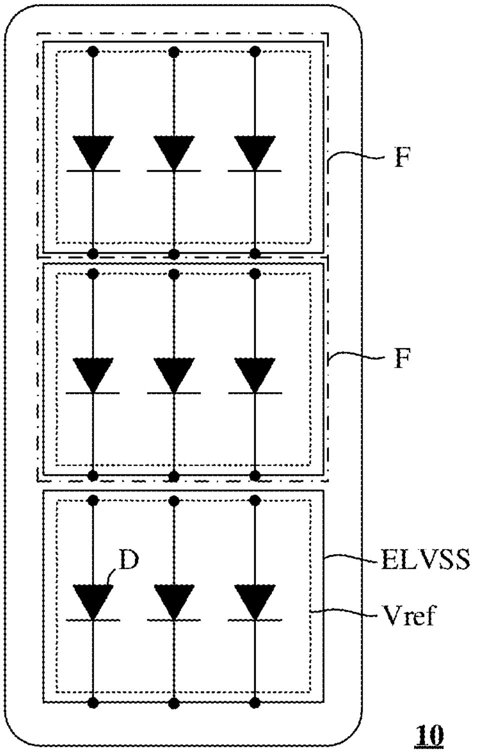
FIG. 1 shows a schematic structural diagram of a display panel according to embodiments of the present application.

Features and exemplary embodiments of various aspects of the present application will be described in detail below. In order to make the objectives, technical solutions, and advantages of the present application clearer, the present application will be further described in detail below with reference to the drawings and specific embodiments. It should be understood that the specific embodiments described herein are merely intended to explain the present application, rather than to limit the present application. For those skilled in the art, the present application can be implemented without some of these specific details. The following description of the embodiments is merely to provide a better understanding of the present application by illustrating the examples of the present application.

It should be noted that the transistor in the embodiments of the present application may be an N-type transistor or a P-type transistor. For the N-type transistor, the turn on level is a high level and the turn off level is a low level. That is, the N-type transistor is turned on when the gate of the N-type transistor is at the high level and is turned off when the gate of the N-type transistor is at the low level. For the P-type transistor, the turn on level is a low level and the turn off level is a high level. That is, the P-type transistor is turned on when the control terminal of the P-type transistor is at the low level and is turned off when the control terminal of the P-type transistor is at the high level. In specific implementations, the gate of the transistor is used as its control terminal, and depending on a signal of the gate and the type of the transistor, its first terminal may be used as the source and its second terminal may be used as the drain, or alternatively, its first terminal may be used as the drain and its second terminal may be used as the source, which is not limited herein. Further, the turn on level and the turn off level are used in a general sense in the embodiments of the present application, the turn on level refers to any level that can turn on the transistor, and the turn off level refers to any level that can cut off/turn off the transistor.

In the embodiments of the present application, the term "electrically connected" may indicate that two components are directly electrically connected, or that the two components are electrically connected via one or more other components.

It will be apparent to those skilled in the art that various modifications and variations can be made to the present application without departing from the gist or scope of the present application. Accordingly, the present application is intended to encompass the modifications and variations to the present application that fall within the scope of the appended claims (the claimed technical solutions) and equivalents thereof. It should be noted that the implementations provided by the embodiments of the present application can be combined with one another if there is no conflict.

Before the technical solutions provided by the embodiments of the present application are described, the problems in the art are first described in the present application to facilitate the understanding of the embodiments of the present application.

With the continuous development of display technology, display panels are more and more widely applied, and user's demand for the display panels is greater and greater. At present, some display panels use auxiliary cathode graphics to achieve partition based control for the first power supply voltage signal (that is, the ELVSS signal), and an appropriate voltage value of the first power supply voltage signal in each partition can be obtained according to the display brightness and the total current of the partition, so as to save power consumption.

One end of the light-emitting element receives the first power supply voltage signal, and the other end receives the initialization voltage signal (that is, the Vref signal). The initial cross-voltage value of the two ends of the light-emitting element is equal to the difference between the voltage value of the initialization voltage signal and the voltage value of the first power supply voltage signal. Since the voltage values of the first power supply voltage signals in different partitions are different, the initial cross-voltage value of the two ends of the light-emitting element varies significantly if the voltage values of the initialization voltage signals are the same, resulting in relatively great brightness difference in different areas. Especially for low gray scales, the brightness difference in different areas is more obvious.

Based on the above findings of the inventors, the embodiments of the present application provide a display panel, a method for driving a display panel, and a display apparatus, which can solve the above technical problems in the related art.

The technical concept of the embodiments of the present application is that both the first initialization signal line and the first power supply voltage signal line are arranged independently for the partitions, so that the first initialization signal lines in different partitions are set independently, and an appropriate initial cross-voltage value for the light-emitting element in each partition can be obtained according to the change in the first power supply voltage signal transmitted by the first power supply voltage signal line, which is beneficial for reducing the initial cross-voltage value difference and the brightness difference for the light-emitting elements in different partitions.

A display panel according to the embodiments of the present application is first described below.

FIG. 1 shows a schematic structural diagram of a display panel according to embodiments of the present application. As shown in FIG. 1, a display panel 10 according to the embodiments of the present application may include at least two partitions F, at least two first power supply voltage signal lines ELVSS, and at least two first initialization signal lines Vref. Herein, the number of the partitions F in the display panel 10 may be adjusted flexibly according to actual situations, which is not limited in the embodiments of the present application. In some examples, each partition F may correspond to one first power supply voltage signal line ELVSS, and moreover, each partition F may correspond to one first initialization signal line Vref, so that the first power supply voltage signal line ELVSS and the first initialization signal line Vref are arranged independently for the partitions.

Each partition F may include at least one sub-pixel, and the sub-pixel may include a light-emitting element D. Herein, the number of the sub-pixels in the partition F may be adjusted flexibly according to actual situations, which is not limited in the embodiments of the present application. Exemplarily, the light-emitting element D includes, but is not limited to, an Organic Light-Emitting Diode (OLED). The first initialization signal line Vref may be electrically connected to a first electrode of the light-emitting element D and configured to transmit a first initialization signal for initializing the first electrode of the light-emitting element D. The first power supply voltage signal line ELVSS may be electrically connected to a second electrode of the light-emitting element D and configured to transmit a first power supply voltage signal. Exemplarily, the first electrode of the light-emitting element D may be an anode of the light-emitting element D, and the second electrode of the light-emitting element D may be a cathode of the light-emitting element D.

In the embodiments of the present application, the first electrodes in the display area of the display panel are insulated from each other, and the first initialization signal lines Vref connected to the first electrodes of the light-emitting elements D in at least two of the partitions F are different. The second electrodes of the light-emitting elements D located in at least two of the partitions F are insulated from each other, that is, not electrically connected to each other. For example, in some examples, the display panel may be provided with isolation structures, which may be located between the light-emitting elements D in different partitions F and configured to isolate the second electrodes of the light-emitting elements D in different partitions F. The first power supply voltage signal lines ELVSS connected to the second electrodes of the light-emitting elements D in at least two of the partitions F are different.

Since the first power supply voltage signal lines ELVSS connected to different partitions F may be different, the voltage values of the first power supply voltage signals received by the light-emitting elements D in different partitions F may be set flexibly for different partitions. Similarly, since the first initialization signal lines Vref connected to different partitions F may be different, the voltage values of the first initialization signals received by the light-emitting elements D in different partitions F may also be set flexibly for different partitions. For example, for a partition F which has a relatively great voltage value of the first power supply voltage signal, the voltage value of the first initialization signal received by the partition F may be set to be relatively great. For a partition F which has a relatively small voltage value of the first power supply voltage signal, the voltage value of the first initialization signal received by the partition F may be set to be relatively small. This is beneficial for reducing the initial cross-voltage value difference for the light-emitting elements in different partitions, and further beneficial for reducing the brightness difference for the light-emitting elements in different partitions.

The display panel according to the embodiments of the present application includes at least two partitions, at least two first power supply voltage signal lines, and at least two first initialization signal lines, each of the partitions includes at least one sub-pixel, and the sub-pixel includes the light-emitting element; and the first initialization signal lines connected to the first electrodes of the light-emitting elements in at least two of the partitions are different, the second electrodes of the light-emitting elements in at least two of the partitions are insulated from each other, the first power supply voltage signal lines connected to the second electrodes of the light-emitting elements in at least two of the partitions are different, the first initialization signal line is configured to transmit the first initialization signal for initializing the first electrode of the light-emitting element, and the first power supply voltage signal line is configured to transmit the first power supply voltage signal. In the embodiments of the present application, both the first initialization signal line and the first power supply voltage signal line are arranged independently for the partitions, so that the first initialization signal lines in different partitions are set independently, and an appropriate initial cross-voltage value for the light-emitting element in each partition can be obtained according to the change in the first power supply voltage signal transmitted by the first power supply voltage signal line, which is beneficial for reducing the initial cross-voltage value difference and the brightness difference for the light-emitting elements in different partitions.

Figure 2:
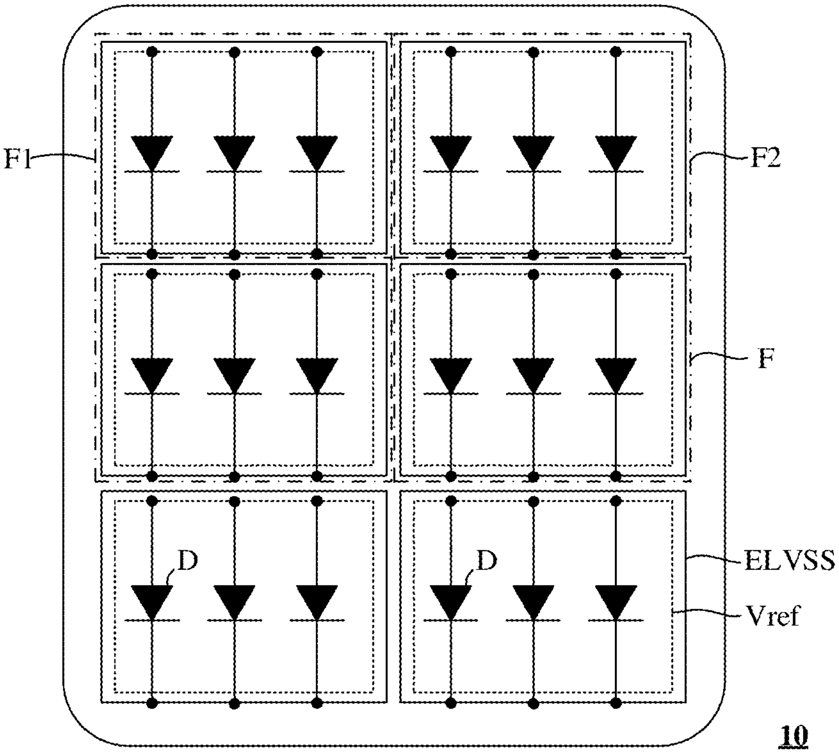
FIG. 2 shows another schematic structural diagram of a display panel according to embodiments of the present application.

FIG. 2 shows a schematic structural diagram of a display panel according to embodiments of the present application. As shown in FIG. 2, according to some embodiments of the present application, optionally, the at least two partitions F may include a first partition F1 and a second partition F2. Herein, the first partition F1 and the second partition F2 are any different partitions F. The first power supply voltage signal line ELVSS correspondingly connected to the first partition F1 may provide a first power supply voltage signal with a first voltage value, and the first initialization signal line Vref correspondingly connected to the first partition F1 may provide a first initialization signal with a second voltage value. Specific values of the first voltage value and the second voltage value may be set flexibly according to actual situations, which is not limited in the embodiments of the present application.

The first power supply voltage signal line ELVSS correspondingly connected to the second partition F2 provides a first power supply voltage signal with a third voltage value, and the first initialization signal line Vref correspondingly connected to the second partition F2 provides a first initialization signal with a fourth voltage value. Specific values of the third voltage value and the fourth voltage value may be set flexibly according to actual situations, which is not limited in the embodiments of the present application.

Herein, the first voltage value is different from the third voltage value, and the second voltage value is different from the fourth voltage value.

That is, the first power supply voltage signal line ELVSS correspondingly connected to the first partition F1 and the first power supply voltage signal line ELVSS correspondingly connected to the second partition F2 may provide first power supply voltage signals with different voltage values. The first power supply voltage signal may be a negative power supply voltage signal. Accordingly, the first initialization signal line Vref correspondingly connected to the first partition F1 and the first initialization signal line Vref correspondingly connected to the second partition F2 may provide first initialization signals with different voltage values.

For example, if a voltage value of the first power supply voltage signal transmitted by the first power supply voltage signal line ELVSS correspondingly connected to the first partition F1 is greater than a voltage value of the first power supply voltage signal transmitted by the first power supply voltage signal line ELVSS correspondingly connected to the second partition F2, a voltage value of the first initialization signal transmitted by the first initialization signal line Vref correspondingly connected to the first partition F1 may also be greater than a voltage value of the first initialization signal transmitted by the first initialization signal line Vref correspondingly connected to the second partition F2. This is beneficial for reducing the initial cross-voltage value difference for the light-emitting elements in different partitions, and further beneficial for reducing the brightness difference for the light-emitting elements in different partitions.

In some specific embodiments, optionally, a difference between the first voltage value and the second voltage value is a first difference, that is, the initial cross-voltage value of the light-emitting element in the first partition F1 is an absolute value of the first difference, and a difference between the third voltage value and the fourth voltage value is a second difference, that is, the initial cross-voltage value of the light-emitting element in the second partition F2 is an absolute value of the second difference. Herein, a difference between the first difference and the second difference is less than a preset threshold. The preset threshold may be adjusted flexibly according to actual situations, which is not limited in the embodiments of the present application.

The less the preset threshold, the less the difference between the initial cross-voltage value of the light-emitting element in the first partition F1 and the initial cross-voltage value of the light-emitting element in the second partition F2. For example, in some examples, the preset threshold may be equal to 0, that is, the initial cross-voltage value of the light-emitting element in the first partition F1 may be equal to the initial cross-voltage value of the light-emitting element in the second partition F2, thereby reducing the initial cross-voltage value difference and the brightness difference for the light-emitting elements in different partitions to a greater extent.

Still referring to FIG. 2, according to some embodiments of the present application, optionally, the first electrodes of the light-emitting elements D in a same partition F may be connected to a same first initialization signal line Vref, and the second electrodes of the light-emitting elements D in a same partition F may be connected to a same first power supply voltage signal line ELVSS.

That is, the first electrodes of the light-emitting elements D in the same partition F may receive first initialization signals with a same voltage value, and the second electrodes of the light-emitting elements D in the same partition F may receive first power supply voltage signals with a same voltage value.

In this way, the first electrodes of the light-emitting elements D in the same partition F are connected to the same first initialization signal line Vref, and the second electrodes of the light-emitting elements D in the same partition F are connected to the same first power supply voltage signal line ELVSS, so that the number of the first initialization signal lines Vref and the number of the first power supply voltage signal lines ELVSS in the display panel can be reduced, which is beneficial for wiring design and saving production cost.

Figure 3:
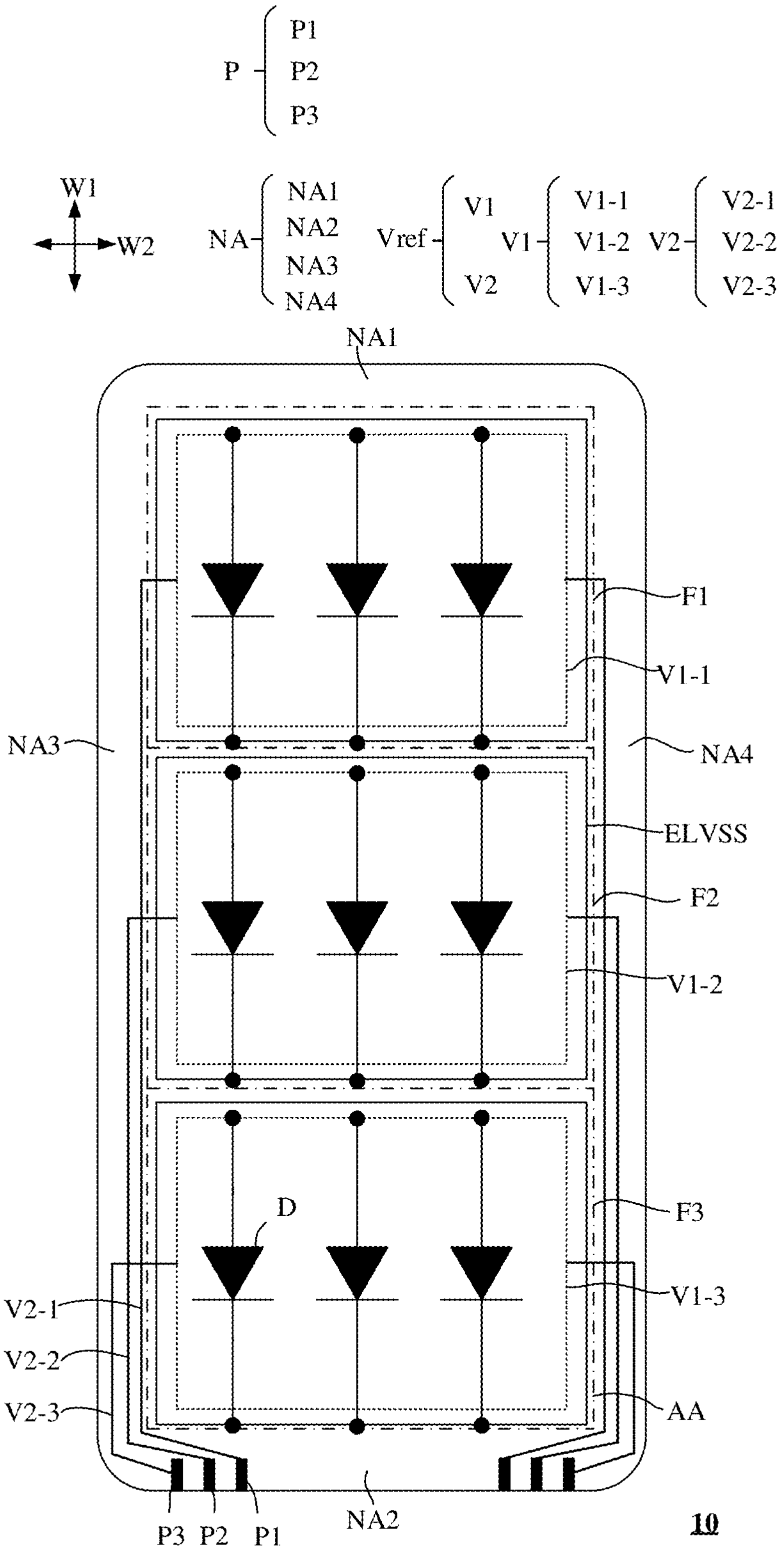
FIG. 3 shows a schematic circuit diagram of a display panel according to embodiments of the present application.

FIG. 3 shows a schematic circuit diagram of a display panel according to embodiments of the present application. As shown in FIG. 3, according to some embodiments of the present application, optionally, the display panel 10 may include a display area AA and a non-display area NA. A plurality of partitions F may be located in the display area AA. The first initialization signal line Vref may include a first sub-initialization signal line V1 located in the display area AA and a second sub-initialization signal line V2 located in the non-display area NA. First sub-initialization signal lines V1 connected to the first electrodes of the light-emitting elements D in at least two of the partitions F are different, and for example, the first electrodes of the light-emitting elements D in different partitions F may be connected to different first sub-initialization signal lines V1. Different first sub-initialization signal lines V1 are connected to different second sub-initialization signal lines V2.

In some examples, the display panel 10 may include a plurality of first bonding pads P, and different second sub-initialization signal lines V2 may be connected to different first bonding pads P. Different first bonding pads P may be electrically connected to different first initialization signal output ends of a driving module (not shown). Herein, the first initialization signal output end is configured to provide the first initialization signal. Exemplarily, the driving module includes, but is not limited to, a display driving chip or a power supply chip.

In this way, since different second sub-initialization signal lines V2 are respectively electrically connected to different first initialization signal output ends of the driving module through different first bonding pads P, and different first initialization signal output ends may output first initialization signals with the same voltage value or different voltage values, different second sub-initialization signal lines V2 may transmit the first initialization signals with the same voltage value or different voltage values, and thus different first sub-initialization signal lines V1 may receive the first initialization signals with the same voltage value or different voltage values.

For example, FIG. 3 shows that the display panel includes three partitions F (that is, the partition F1', the partition F2', and the partition F3'). As shown in FIG. 3, corresponding to the three partitions, the first sub-initialization signal line V1 may include a first sub-initialization signal line V1-1, a first sub-initialization signal line V1-2, and a first sub-initialization signal line V1-3, and the second sub-initialization signal line V2 may include a second sub-initialization signal line V2-1, a second sub-initialization signal line V2-2, and a second sub-initialization signal line V2-3. The first bonding pad P may include a first binding pad P1, a first bonding pad P2, and a first bonding pad P3. The first bonding pad P1, the first bonding pad P2, and the first bonding pad P3 may be connected to different first initialization signal output ends.

The first electrodes of the light-emitting elements D in the partition F1' may be connected to the first sub-initialization signal line V1-1, and the first sub-initialization signal line V1-1 may be electrically connected to the first bonding pad P1 through the second sub-initialization signal line V2-1. The first electrodes of the light-emitting elements D in the partition F2' may be connected to the first sub-initialization signal line V1-2, and the first sub-initialization signal line V1-2 may be electrically connected to the first bonding pad P2 through the second sub-initialization signal line V2-2. The first electrodes of the light-emitting elements D in the partition F3' may be connected to the first sub-initialization signal line V1-3, and the first sub-initialization signal line V1-3 may be electrically connected to the first bonding pad P3 through the second sub-initialization signal line V2-3.

In some examples, the first bonding pad P1, the first bonding pad P2, and the first bonding pad P3 may receive first initialization signals with different voltage values, and thus the second sub-initialization signal line V2-1, the second sub-initialization signal line V2-2, and the second sub-initialization signal line V2-3 may transmit the first initialization signals with different voltage values to the partition F1', the partition F2', and the partition F3'.

Still referring to FIG. 3, according to some embodiments of the present application, optionally, the non-display area NA may include a first non-display area NA1 and a second non-display area NA2 that are opposite to each other and a third non-display area NA3 and a fourth non-display area NA4 that are opposite to each other. The first non-display area NA1, the display area AA and the second non-display area NA2 may be arranged in sequence along a column direction W1 of the display panel, the third non-display area NA3, the display area AA and the fourth non-display area NA4 may be arranged in sequence along a row direction W2 of the display panel, and the column direction W1 intersects the row direction W2. In some examples, the first non-display area NA1 may be an upper frame, the second non-display area NA2 may be a lower frame, the third non-display area NA3 may be a left frame, and the fourth non-display area NA4 may be a right frame.

The first bonding pads P may be located in the second non-display area NA2 and electrically connected to the first initialization signal output ends of the driving module. The second sub-initialization signal lines V2 may be located in the third non-display area NA3 or the fourth non-display area NA4 and extend to the first bonding pads P. For example, in some examples, the first sub-initialization signal line V1 correspondingly connected to one partition F may be connected to two second sub-initialization signal lines V2 which may be located in the third non-display area NA3 and the fourth non-display area NA4, respectively. For example, in some other examples, the first sub-initialization signal line V1 correspondingly connected to one partition F may be connected to one second sub-initialization signal line V2 which may be located in the third non-display area NA3 or the fourth non-display area NA4.

Figure 4:
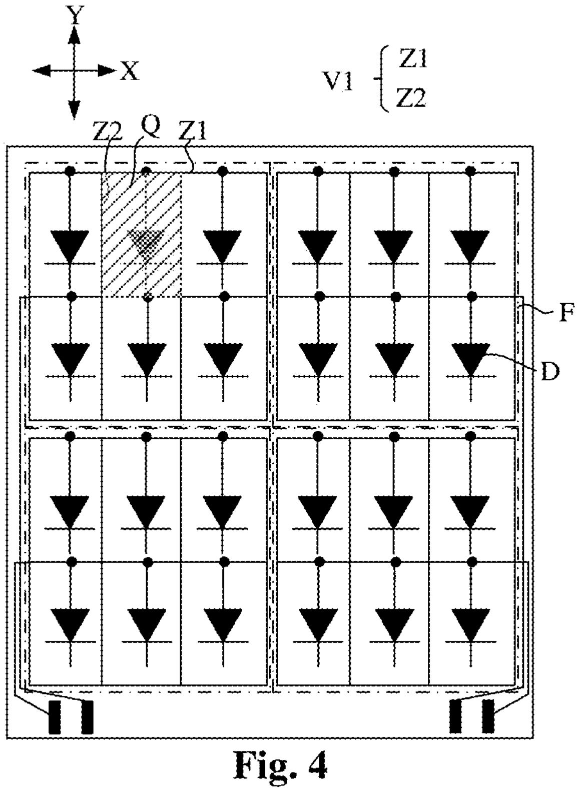
FIG. 4 shows another schematic circuit diagram of a display panel according to embodiments of the present application.

FIG. 4 shows another schematic circuit diagram of a display panel according to embodiments of the present application. As shown in FIG. 4, according to some embodiments of the present application, optionally, the first sub-initialization signal line V1 connected to the first electrodes of the light-emitting elements D in a same partition F may include a first wiring portion Z1 extending along a first direction X and a second wiring portion Z2 extending along a second direction Y, and the first wiring portion Z1 is electrically connected to the second wiring portion Z2. Exemplarily, the first direction X may be a row direction of the display panel, and the second direction Y may be a column direction of the display panel. Alternatively, the first direction X may be the column direction of the display panel, and the second direction Y may be the row direction of the display panel, which is not limited in the embodiments of the present application.

Still referring to FIG. 4, according to some embodiments of the present application, optionally, the first sub-initialization signal line V1 connected to the first electrodes of the light-emitting elements D in a same partition F may include a plurality of first wiring portions Z1 and a plurality of second wiring portions Z2, and the plurality of first wiring portions Z1 and the plurality of second wiring portions Z2 are cross-connected to form a mesh structure.

In this way, since the plurality of first wiring portions Z1 and the plurality of second wiring portions Z2 are cross-connected to form a mesh structure, the wiring impedance of the first sub-initialization signal line V1 and the first initialization signal line Vref is greatly reduced, so as to ensure that the voltage values of the first initialization signals received by the light-emitting elements D in the same partition F are the same or similar, thereby ensuring that the initial cross-voltage values of the light-emitting elements D in the same partition F are the same or similar.

Still referring to FIG. 4, according to some embodiments of the present application, optionally, along a thickness direction of the display panel, an area (such as the dashed area Q shown in FIG. 4) formed by an orthographic projection of the mesh structure includes the first electrodes of N of the light-emitting elements in a corresponding one of the partitions F, $1 \leq N \leq M$, M represents the number of the light-emitting elements in the corresponding partition of the mesh structure, and N and M are both positive integers.

For example, FIG. 4 shows that each partition includes six light-emitting elements, that is, M=6. As shown in FIG. 4, the area (such as the dashed area Q shown in FIG. 4) formed by the orthographic projection of the mesh structure may include the first electrode of one light-emitting element in the corresponding partition F, that is, N=1. In other words, the first wiring portion Z1 or the second wiring portion Z2 may be arranged at four sides (that is, upper, lower, left and right sides) of the first electrode of each light-emitting element D.

Figure 5:
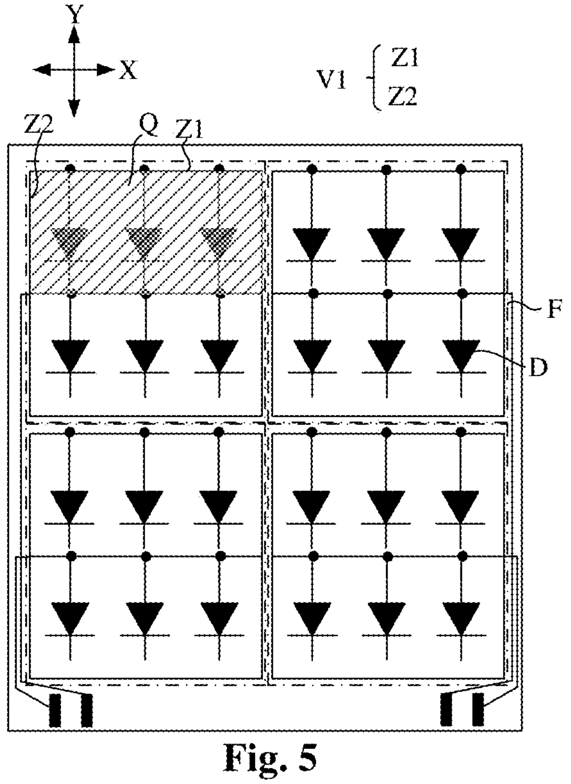
FIG. 5 shows yet another schematic circuit diagram of a display panel according to embodiments of the present application.

FIG. 5 shows yet another schematic circuit diagram of a display panel according to embodiments of the present application. As shown in FIG. 5, according to some other embodiments of the present application, optionally, each partition still includes six light-emitting elements, the area (such as the dashed area Q shown in FIG. 5) formed by the orthographic projection of the mesh structure may include the first electrodes of a plurality of light-emitting elements (such as three light-emitting elements) in the corresponding partition F, that is, N<M, and the mesh structure may surround the first electrodes of the plurality of light-emitting elements in the corresponding partition F.

In order to better reduce the wiring impedance of the first sub-initialization signal line V1, in some specific examples, the mesh structure shown in FIG. 4 may be configured to surround the first electrode of one light-emitting element in the corresponding partition F, that is, N=1, so as to increase the number of the first wiring portions Z1 or the number of the second wiring portions Z2 of the first sub-initialization signal line V1 and reduce the wiring impedance of the first sub-initialization signal line V1 as much as possible.

Figure 6:
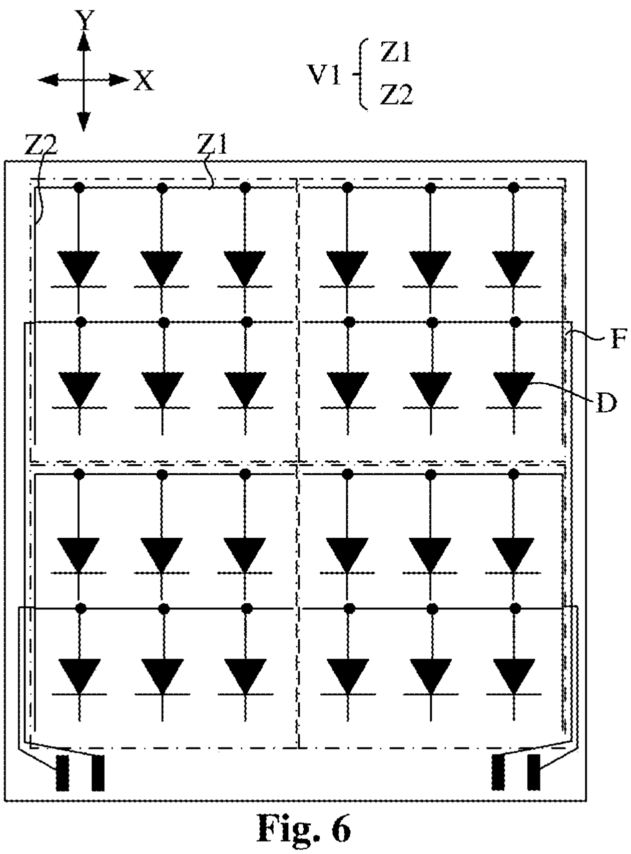
FIG. 6 shows yet another schematic circuit diagram of a display panel according to embodiments of the present application.

FIG. 6 shows yet another schematic circuit diagram of a display panel according to embodiments of the present application. As shown in FIG. 6, unlike the embodiments as shown in FIG. 4, according to some other embodiments of the present application, optionally, the first sub-initialization signal line V1 connected to the first electrodes of the light-emitting elements D in a same partition F may include a plurality of first wiring portions Z1 and one second wiring portion Z2, and the plurality of first wiring portions Z1 and the second wiring portion Z2 are connected to form a comb-like structure. The comb-like structure may be understood as a structure similar to a comb in shape, the second wiring portion Z2 may be regarded as a "comb handle", and the plurality of first wiring portions Z1 may be regarded as "comb teeth". For example, as shown in FIG. 6, if the first sub-initialization signal line V1 may include two first wiring portions Z1 and one second wiring portions Z2, the comb-like structure is in the form of capital letter "F", that is, includes one "comb handle" and two "comb teeth".

In this way, since the plurality of first wiring portions Z1 and the second wiring portion Z2 are connected to form a comb-like structure, the wiring impedance of the first sub-initialization signal line V1 and the first initialization signal line Vref is greatly reduced, so as to ensure that the voltage values of the first initialization signals received by the light-emitting elements D in the same partition F are the same or similar, thereby ensuring that initial cross-voltage values of the light-emitting elements D in the same partition F are the same or similar.

Figure 7:
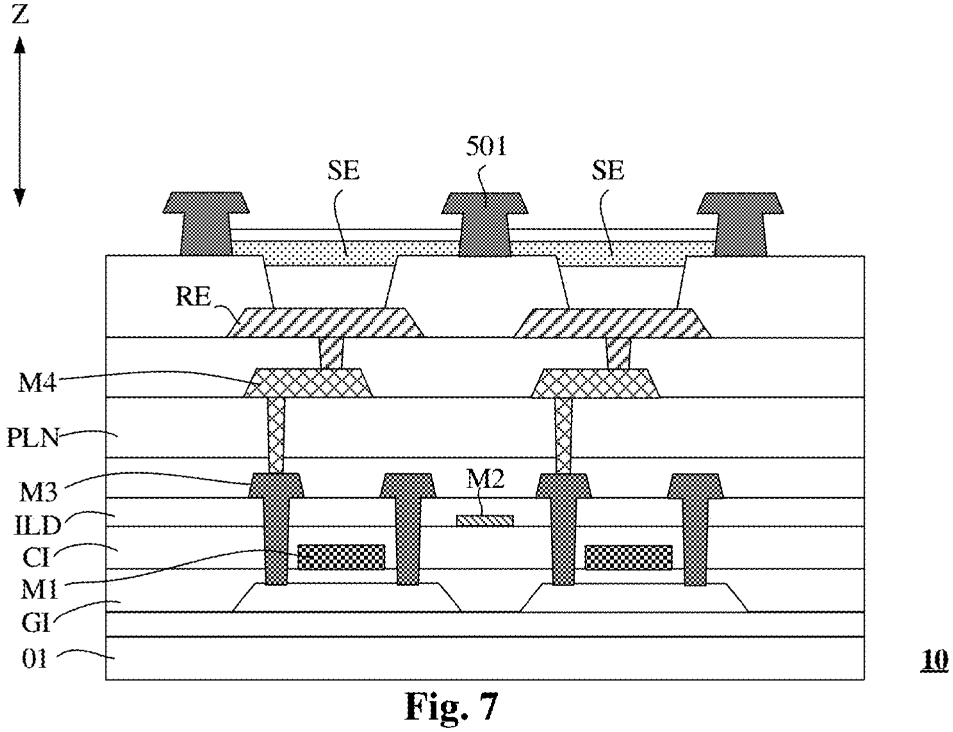
FIG. 7 shows a schematic partial cross-sectional diagram of a display panel according to embodiments of the present application.

FIG. 7 shows a schematic partial cross-sectional diagram of a display panel according to embodiments of the present application. As shown in FIG. 7, according to some embodiments of the present application, optionally, along the thickness direction Z of the display panel, the display panel 10 may include a substrate 01, a first metal layer M1, a second metal layer M2, a third metal layer M3, a fourth metal layer M4, and an insulation layer located between any adjacent two of the metal layers. For example, a gate insulation layer GI is arranged between the substrate 01 and the first metal layer M1, a capacitor insulation layer CI is arranged between the first metal layer M1 and the second metal layer M2, an interlayer dielectric layer ILD is arranged between the second metal layer M2 and the third metal layer M3, and a planarization layer PLN is arranged between the third metal layer M3 and the fourth metal layer M4. The substrate 01 may be a flexible substrate or a rigid substrate, which is not limited in the embodiments of the present application. In some examples, the first metal layer M1 may be configured to form a gate of a transistor, the second metal layer M2 may be configured to form an electrode plate of a capacitor, and the third metal layer M3 may be configured to form a connection structure for a source and a drain of the transistor. Along the thickness direction Z of the display panel, the display panel further include an anode layer RE located at a side of the fourth metal layer M4 away from the third metal layer M3. The first electrode of the light-emitting element may be located in the anode layer RE.

As shown FIG. 4 and FIG. 7, one of the first wiring portion Z1 and the second wiring portion Z2 may be located in the second metal layer M2, and the other may be located in the third metal layer M3 or the fourth metal layer M4. As an example, the first wiring portion Z1 is located in the second metal layer M2, and the second wiring portion Z2 is located in the third metal layer M3 or the fourth metal layer M4. As another example, the second wiring portion Z2 is located in the second metal layer M2, and the first wiring portion Z1 is located in the third metal layer M3 or the fourth metal layer M4. The first wiring portion Z1 is connected to the second wiring portion Z2 through a via.

In this way, by arranging the first wiring portion Z1 and the second wiring portion Z2 in at least two metal layers, the first sub-initialization signal line V1 with the mesh structure or the comb-like structure may be formed, which is beneficial for greatly reducing the wiring impedance of the first sub-initialization signal line V1 and the first initialization signal line Vref, so as to ensure that the voltage values of the first initialization signals received by the light-emitting elements D in the same partition F are the same or similar, thereby ensuring that the initial cross-voltage values of the light-emitting elements D in the same partition F are the same or similar.

Still referring to FIG. 7, according to some embodiments of the present application, optionally, the display panel 10 may include isolation structures 501, the isolation structures 501 in different partitions are insulated from each other, and the isolation structures 501 may be configured to at least isolate the second electrodes SE of the light-emitting elements. That is, the second electrodes SE of the light-emitting elements in different partitions may be insulated from each other.

According to some embodiments of the present application, optionally, the voltage value of the first initialization signal received by each partition may be adjusted flexibly. For example, for any i-th partition in the display panel, a voltage value of the first initialization signal transmitted by the first initialization signal line Vref correspondingly connected to the i-th partition is determined according to a voltage value of the first power supply voltage signal transmitted by the first power supply voltage signal line ELVSS correspondingly connected to the i-th partition and a preset initial cross-voltage value, the initial cross-voltage value is a voltage difference between the voltage value of the first initialization signal and the voltage value of the first power supply voltage signal, and i is a positive integer. For example, the initial cross-voltage value may include the first difference and the second difference described above, and the first difference and the second difference may be the same.

For example, the voltage value of the first initialization signal transmitted by the first initialization signal line Vref correspondingly connected to the i-th partition may be calculated according to the following equation:

$$Vint = A + ELVSS' \tag{1}$$

Herein, Vint represents the voltage value of the first initialization signal transmitted by the first initialization signal line Vref correspondingly connected to the i-th partition, A represents the preset initial cross-voltage value, and ELVSS' represents the voltage value of the first power supply voltage signal transmitted by the first power supply voltage signal line ELVSS correspondingly connected to the i-th partition.

Herein, the initial cross-voltage value A may be preset, and the specific value of the initial cross-voltage value A may be adjusted flexibly according to actual situations, such as according to the quality of the displayed image (such as the brightness or the chroma uniformity), which is not limited in the embodiments of the present application. After the voltage value ELVSS' of the first power supply voltage signal is determined, the voltage value Vint of the first initialization signal may be determined.

In some embodiments, the initial cross-voltage values corresponding to different partitions may be the same. That is, it is ensured that the initial cross-voltage values of the light-emitting elements in different partitions are the same, so that the brightness difference of the light-emitting elements in the different partitions is relatively less.

In some embodiments, the initial cross-voltage value is greater than 0 V, that is, the voltage value Vint of the first initialization signal is greater than the voltage value ELVSS' of the first power supply voltage signal, so that the first electrode of the light-emitting element has a relatively high potential, which is beneficial for reducing the subsequent charging duration of the light-emitting element, and thus the light-emitting element emits light quickly.

According to some embodiments of the present application, optionally, the display brightness range of the partitions may be divided into a plurality of different brightness intervals, and different partitions may be in different brightness intervals when a complex image is displayed. In order to reduce the initial cross-voltage difference for the light-emitting elements in different partitions as much as possible, optionally, different brightness intervals may correspond to the same initial cross-voltage value. For example, the display brightness range of the partitions is 0 to 1000 nit, which may be divided into a plurality of different brightness intervals. For example, 0 to 100 nit forms one brightness interval, 101 to 200 nit forms one brightness interval, . . . , and 901 to 1000 nit forms one brightness interval. Different brightness intervals may correspond to the same initial cross-voltage value, that is, the brightness interval 0 to 100 nit corresponds to an initial cross-voltage value A, the brightness interval 101 to 200 nit also corresponds to the initial cross-voltage value A, . . . , and the brightness interval 901 to 1000 nit also corresponds to the initial cross-voltage value A.

When the partitions are in different brightness intervals, the voltage value Vint of the first initialization signal may be calculated using the same initial cross-voltage value A.

According to some embodiments of the present application, optionally, the voltage value of the first power supply voltage signal transmitted by the first power supply voltage signal line correspondingly connected to the i-th partition may be determined according to the following step one and step two.

Step one: acquiring a target brightness of a sub-image to be displayed by the i-th partition, and the target brightness including an average brightness or a maximum brightness.

The gray scale to be displayed by each sub-pixel in the i-th partition is known, and accordingly, the brightness to be displayed by each sub-pixel in the i-th partition may be determined. For example, there are N sub-pixels in the i-th partition, and in step one, the average of the brightness to be displayed by the N sub-pixels may be calculated or the maximum one of the brightness to be displayed by the N sub-pixels may be selected, as the target brightness of the sub-image to be displayed by the i-th partition.

Step two: determining, according to a current brightness interval in which the target brightness is located and a first correspondence relationship between the brightness interval and the voltage value of the first power supply voltage signal, the target voltage value of the first power supply voltage signal corresponding to the current brightness interval.

The first correspondence relationship between the brightness interval and the voltage value of the first power supply voltage signal may be predetermined, in which different brightness intervals may correspond to different voltage values of the first power supply voltage signals to reduce power consumption. The target voltage value of the first power supply voltage signal corresponding to the current brightness interval may be determined according to the current brightness interval in which the target brightness is located and the first correspondence relationship.

In this way, according to the actual brightness to be displayed by each partition, the voltage value of the first power supply voltage signal received by each partition may be adjusted flexibly, which is beneficial for reducing power consumption.

Figure 8:
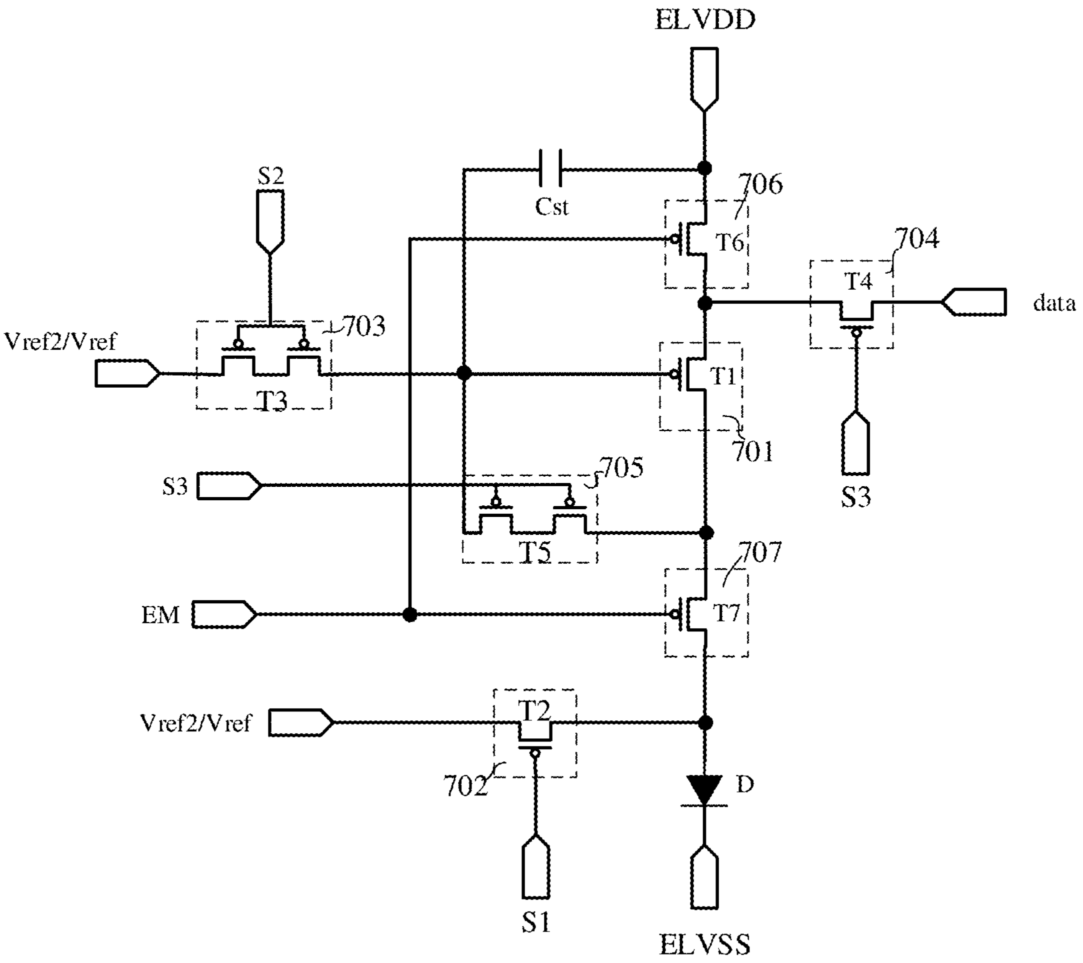
FIG. 8 shows a schematic circuit diagram of a pixel circuit in a display panel according to embodiments of the present application.

FIG. 8 shows a schematic circuit diagram of a pixel circuit in a display panel according to embodiments of the present application. As shown in FIG. 8, according to some embodiments of the present application, optionally, the display panel may further include a first scanning signal line S1, a second scanning signal line S2, and a second initialization signal line Vref2. The sub-pixel may further include a pixel circuit 70 electrically connected to the first electrode of the light-emitting element D. The pixel circuit 70 may include a first driving module 701, a first initialization module 702, and a second initialization module 703. Herein, a control end of the first initialization module 702 is electrically connected to the first scanning signal line S1, a first end of the first initialization module 702 is electrically connected to the first initialization signal line Vref, and a second end of the first initialization module 702 is electrically connected to the first electrode of the light-emitting element D. The first initialization module 702 may be turned on under the control of the first scanning signal line S1 to transmit a first initialization signal of the first initialization signal line Vref to the first electrode of the light-emitting element D, so as to initialize the first electrode of the light-emitting element D.

A control end of the second initialization module 703 is electrically connected to the second scanning signal line S2, a first end of the second initialization module 703 is electrically connected to the second initialization signal line Vref2, and a second end of the second initialization module 703 is electrically connected to a control end of the first driving module 701. The second initialization module 703 may be configured to transmit a second initialization signal of the second initialization signal line Vref2 to the control end of the first driving module 701 to initialize the control end of the first driving module 701.

In the embodiments shown in FIG. 8, the second initialization signal line Vref2 may reuse the first initialization signal line Vref. That is, the first initialization signal line Vref in each partition may be connected to both the first initialization module 702 and the second initialization module 703, and in addition to initializing the first electrode of the light-emitting element D, the first initialization signal provided by the first initialization signal line Vref in each partition may be further configured to initialize the control end of the first driving module 701.

It should be noted that the pixel circuit in the embodiments of the present application is not limited to the pixel circuit shown in FIG. 8, but is applicable to all pixel circuits with the first initialization signal (that is, resetting the first electrode of the light-emitting element).

Still referring to FIG. 8, according to some embodiments of the present application, optionally, the pixel circuit 70 may further include a data writing module 704, a threshold compensation module 705, a first light emitting control module 706, a second light emitting control module 707, and a storage capacitor Cst. Each of the modules may include a thin film transistor. For example, the first driving module 701 includes a first transistor T1, the first initialization module 702 includes a second transistor T2, the second initialization module 703 includes a third transistor T3, the data writing module 704 includes a fourth transistor T4, the threshold compensation module 705 includes a fifth transistor T5, the first light emitting control module 706 includes a sixth transistor T6, and the second light emitting control module 707 includes a seventh transistor T7. Reference is made to FIG. 8 for connections of the various transistors, which will not be repeated herein.

Unlike the embodiments shown in FIG. 8, according to some other embodiments of the present application, optionally, the second initialization signal line Vref2 may not reuse the first initialization signal line Vref, that is, the second initialization signal line Vref2 and the first initialization signal line Vref are different signal lines.

Figure 9:
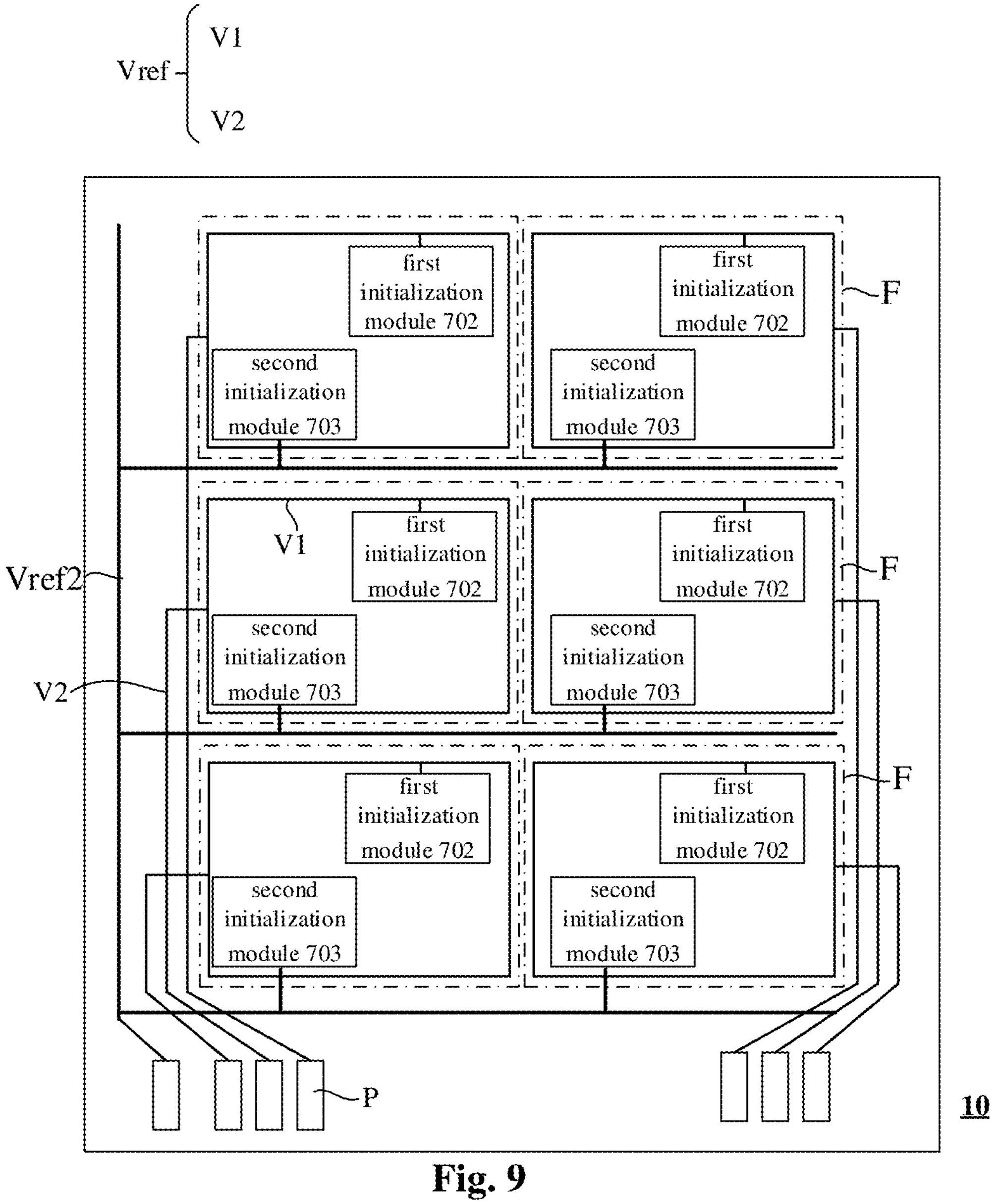
FIG. 9 shows yet another schematic circuit diagram of a display panel according to embodiments of the present application.

FIG. 9 shows yet another schematic circuit diagram of a display panel according to embodiments of the present application. As shown in FIG. 9, unlike the first initialization signal lines Vref being arranged independently for the partitions, the second initialization signal line Vref2 may be arranged as a whole. Specifically, the second initialization signal line Vref2 connected to the pixel circuits in at least two of the partitions F is different from the first initialization signal lines Vref. The second initialization signal line Vref2 may be electrically connected to the second initialization modules 703 of the pixel circuits in a plurality of partitions F.

In this way, since the second initialization signal transmitted by the second initialization signal line Vref2 does not affect the cross-voltage of the light-emitting element, the second initialization signal line Vref2 is electrically connected to the second initialization modules 703 of the pixel circuits in a plurality of partitions F, which may be beneficial for the wiring of the second initialization signal line Vref2.

Based on the display panel according to the above embodiments, accordingly, the embodiments of the present application further provide a specific implementation of a method for driving a display panel. The method for driving a display panel may be applied to the display panel 10 according to the above embodiments, and reference is made to the following embodiments.

Figure 10:
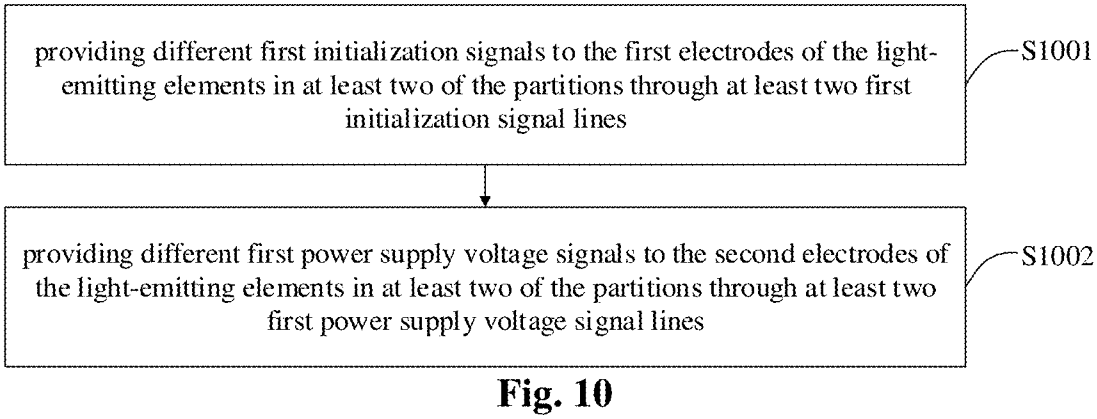
FIG. 10 shows a flow chart of a method for driving a display panel according to embodiments of the present application.

FIG. 10 shows a flow chart of a method for driving a display panel according to embodiments of the present application. As shown in FIG. 10, the method for driving a display panel may include the following steps:

S1001: providing different first initialization signals to the first electrodes of the light-emitting elements in at least two of the partitions through at least two first initialization signal lines; and S1002: providing different first power supply voltage signals to the second electrodes of the light-emitting elements in at least two of the partitions through at least two first power supply voltage signal lines.

Reference is made to the above description for the specific implementation of S1001 and S1002, which will not be repeated herein.

In the method for driving a display panel according to the embodiments of the present application, both the first initialization signal line and the first power supply voltage signal line are arranged independently for the partitions, and the voltage value of the first initialization signal of each partition may be set independently according to the voltage value of the first power supply voltage signal of each partition and the initial cross-voltage value corresponding to each partition, and an appropriate initial cross-voltage value for the light-emitting element in each partition can be obtained according to the change in the first power supply voltage signal transmitted by the first power supply voltage signal line, which is beneficial for reducing the initial cross-voltage value difference and the brightness difference for the light-emitting elements in different partitions.

Figure 11:
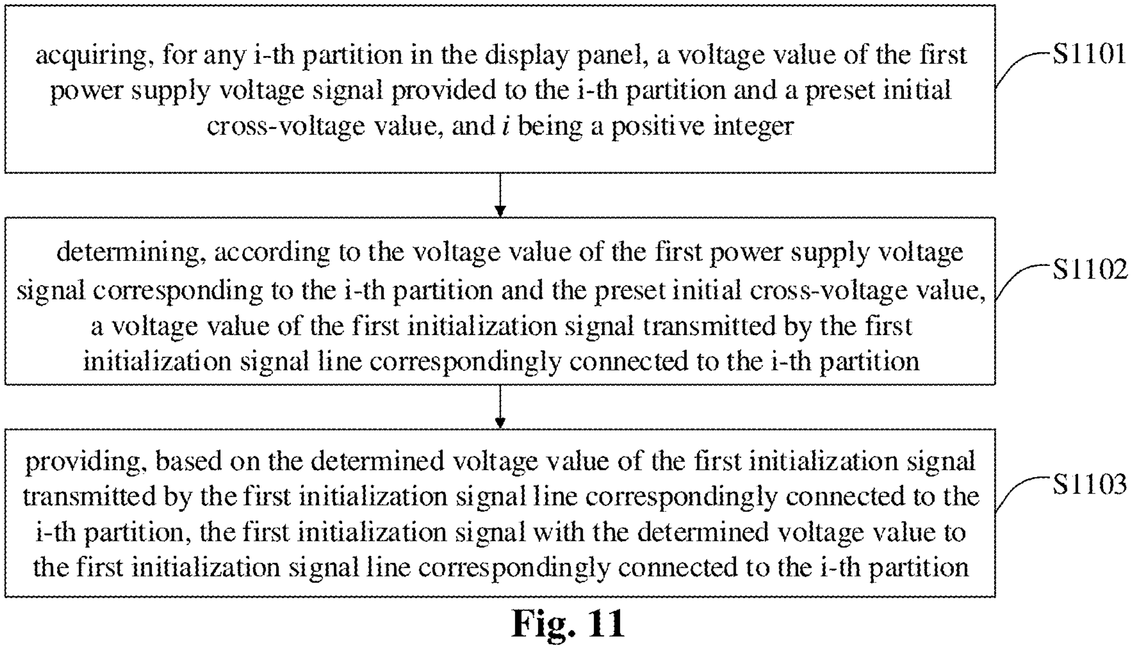
FIG. 11 shows a flow chart of S1001 in the method for driving a display panel according to embodiments of the present application.

FIG. 11 shows a flow chart of S1001 in the method for driving a display panel according to embodiments of the present application. As shown in FIG. 11, S1001 (providing different first initialization signals to the first electrodes of the light-emitting elements in at least two of the partitions through at least two first initialization signal lines) may specifically include the following steps S1101 to S1103.

S1101: acquiring, for any i-th partition in the display panel, a voltage value of the first power supply voltage signal provided to the i-th partition and a preset initial cross-voltage value, and i being a positive integer.

S1102: determining, according to the voltage value of the first power supply voltage signal corresponding to the i-th partition and the preset initial cross-voltage value, a voltage value of the first initialization signal transmitted by the first initialization signal line correspondingly connected to the i-th partition.

Herein, the initial cross-voltage value is a voltage difference between the voltage value of the first initialization signal and the voltage value of the first power supply voltage signal For example, the voltage value of the first initialization signal transmitted by the first initialization signal line Vref correspondingly connected to the i-th partition may be calculated according to the following equation:

$$Vint = A + ELVSS' \tag{2}$$

Herein, Vint represents the voltage value of the first initialization signal transmitted by the first initialization signal line Vref correspondingly connected to the i-th partition, A represents the preset initial cross-voltage value, and ELVSS' represents the voltage value of the first power supply voltage signal corresponding to the i-th partition.

Herein, the initial cross-voltage value A may be preset, and the specific value of the initial cross-voltage value A may be adjusted flexibly according to actual situations, such as according to the quality of the displayed image (such as the brightness or the chroma uniformity), which is not limited in the embodiments of the present application. After the voltage value ELVSS' of the first power supply voltage signal is determined, the voltage value Vint of the first initialization signal may be determined.

S1103: providing, based on the determined voltage value of the first initialization signal transmitted by the first initialization signal line correspondingly connected to the i-th partition, the first initialization signal with the determined voltage value to the first initialization signal line correspondingly connected to the i-th partition.

According to some embodiments of the present application, optionally, S1101 (acquiring the voltage value of the first power supply voltage signal provided to the i-th partition) may specifically include the following step one and step two.

Step one: acquiring a target brightness of a sub-image to be displayed by the i-th partition, and the target brightness including an average brightness or a maximum brightness.

The gray scale to be displayed by each sub-pixel in the i-th partition is known, and accordingly, the brightness to be displayed by each sub-pixel in the i-th partition may be determined. For example, there are N sub-pixels in the i-th partition, and in step one, the average of the brightness to be displayed by the N sub-pixels may be calculated or the maximum one of the brightness to be displayed by the N sub-pixels may be selected, as the target brightness of the sub-image to be displayed by the i-th partition.

Step two: determining, according to a current brightness interval in which the target brightness is located and a first correspondence relationship between the brightness interval and the voltage value of the first power supply voltage signal, the target voltage value of the first power supply voltage signal corresponding to the current brightness interval.

The first correspondence relationship between the brightness interval and the voltage value of the first power supply voltage signal may be predetermined, in which different brightness intervals may correspond to different voltage values of the first power supply voltage signals to reduce power consumption. The target voltage value of the first power supply voltage signal corresponding to the current brightness interval may be determined according to the current brightness interval in which the target brightness is located and the first correspondence relationship.

In this way, according to the actual brightness to be displayed by each partition, the voltage value of the first power supply voltage signal received by each partition may be adjusted flexibly, which is beneficial for reducing power consumption.

According to some embodiments of the present application, optionally, the display brightness range of the partitions may be divided into a plurality of different brightness intervals, and different partitions may be in different brightness intervals when a complex image is displayed. In order to reduce the initial cross-voltage difference for the light-emitting elements in different partitions as much as possible, optionally, different brightness intervals may correspond to the same initial cross-voltage value. For example, the display brightness range of the partitions is 0 to 1000 nit, which may be divided into a plurality of different brightness intervals. For example, 0 to 100 nit forms one brightness interval, 101 to 200 nit forms one brightness interval, . . . , and 901 to 1000 nit forms one brightness interval. Different brightness intervals may correspond to the same initial cross-voltage value, that is, the brightness interval 0 to 100 nit corresponds to an initial cross-voltage value A, the brightness interval 101 to 200 nit also corresponds to the initial cross-voltage value A, . . . , and the brightness interval 901 to 1000 nit also corresponds to the initial cross-voltage value A.

When the partitions are in different brightness intervals, the voltage value Vint of the first initialization signal may be calculated using the same initial cross-voltage value A.

The specific implementation of the steps in the method for driving a display panel shown in FIG. 10 and FIG. 11 has been described in detail in the above product embodiments, and corresponding technical effect can be achieved, which will not be repeated herein for brevity of the description.

Based on the display panel according to the above embodiments, accordingly, the embodiments of the present application further provide a driving module. The driving module may be electrically connected to the display panel 10 according to the above embodiments, and reference is made to the following embodiments. Exemplarily, the driving module includes, but is not limited to, a display driving chip or a power supply chip.

Figure 12:
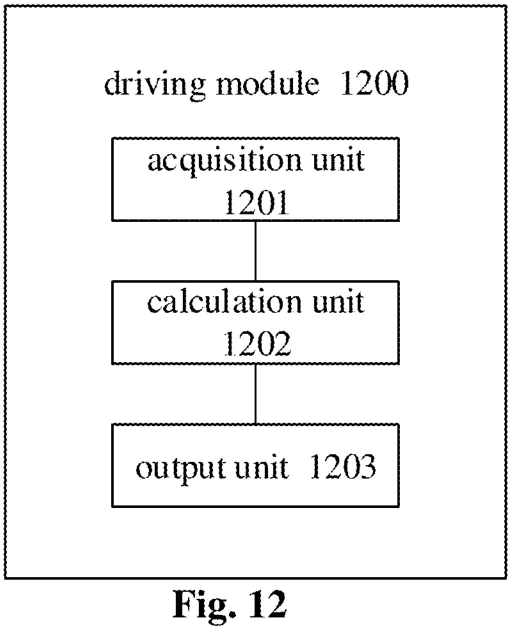
FIG. 12 shows a schematic structural diagram of a driving module according to embodiments of the present application.

FIG. 12 shows a schematic structural diagram of a driving module according to embodiments of the present application. As shown in FIG. 12, a driving module 1200 according to the embodiments of the present application may include: an acquisition unit 1201 configured to acquire, for any i-th partition in the display panel, a voltage value of the first power supply voltage signal provided to the i-th partition and a preset initial cross-voltage value, and i being a positive integer; a calculation unit 1202 configured to determine, according to the voltage value of the first power supply voltage signal corresponding to the i-th partition and the preset initial cross-voltage value, a voltage value of the first initialization signal transmitted by the first initialization signal line correspondingly connected to the i-th partition, and the initial cross-voltage value being a voltage difference between the voltage value of the first initialization signal and the voltage value of the first power supply voltage signal; and an output unit 1203 configured to provide, based on the determined voltage value of the first initialization signal transmitted by the first initialization signal line correspondingly connected to the i-th partition, the first initialization signal with the determined voltage value to the first initialization signal line correspondingly connected to the i-th partition.

Specifically, the voltage value of the first power supply voltage signal provided by the driving module 1200 to each partition is known, and the preset initial cross-voltage value is also known. Therefore, for any i-th partition, the voltage value of the first initialization signal transmitted by the first initialization signal line correspondingly connected to the i-th partition may be determined according to the voltage value of the first power supply voltage signal corresponding to the i-th partition and the preset initial cross-voltage value.

In the driving module according to the embodiments of the present application, the voltage value of the first initialization signal of each partition may be set independently according to the voltage value of the first power supply voltage signal of each partition and the preset initial cross-voltage value, so as to ensure that the light-emitting elements in the partitions may obtain the same or similar initial cross-voltage value, which is beneficial for reducing the initial cross-voltage value difference and the brightness difference for the light-emitting elements in different partitions.

In some embodiments, the acquisition unit 1201 is specifically configured to: acquire a target brightness of a sub-image to be displayed by the i-th partition, and the target brightness including an average brightness or a maximum brightness; and determine, according to a current brightness interval in which the target brightness is located and a first correspondence relationship between the brightness interval and the voltage value of the first power supply voltage signal, the target voltage value of the first power supply voltage signal corresponding to the current brightness interval.

Figure 13:
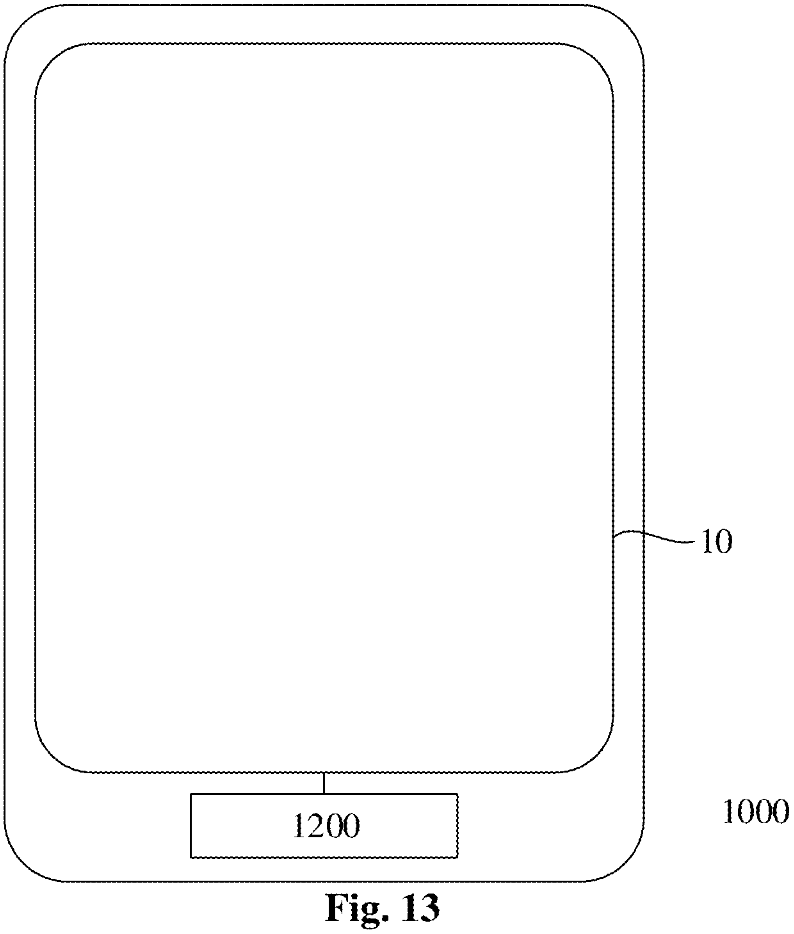
FIG. 13 shows a schematic structural diagram of a display apparatus according to embodiments of the present application.

Based on the display panel or the driving module according to the above embodiments, accordingly, the embodiments of the present application further provide a display apparatus including the display panel or the driving module according to the present application. Referring to FIG. 13, which shows a schematic structural diagram of a display apparatus according to the embodiments of the present application. The display apparatus 1000 as shown in FIG. 13 includes the display panel 10 or the driving module 1200 according to any of the above embodiments of the present application. The embodiment shown in FIG. 13 illustrates the display apparatus 1000, for example, using a cell phone as an example, and it may be understood that, the display apparatus according to the embodiments of the present application may be a wearable product, a computer, a television, an on-board display apparatus, and other display apparatus with display function, which is not specifically limited in the present application. The display apparatus according to the embodiments of the present application has the beneficial effects of the display panel 10 according to the embodiments of the present application, and reference is made to the specific description of the display panel 10 in the above embodiments, which will not be repeated herein.

It should be understood that the specific structures of the circuit and the cross-sectional structures of the display panel provided in the accompanying drawings of the embodiments of the present application are only examples, and are not intended to limit the present application. In addition, the above embodiments of present application may be combined without conflict.

It should be noted that various embodiments in the present specification are described in a progressive manner, the same or similar parts among various embodiment can refer to each other, and each of the embodiment focuses on the differences with other embodiments. The above embodiments of the present application do not exhaustively describe all the details and do not limit the present application to only the specific embodiments described. Obviously, many modifications and variations can be made based on the above description. These embodiments are selected and specifically described in the description to better explain the principles and practical applications of the present application, so that those skilled in the art can make good use of the present application and make modifications based on the present application. The present application is limited only by the claims, along with their full scope and equivalents.

Those skilled in the art can understand that all the above embodiments are exemplary and not limiting. Different technical features in different embodiments can be combined to achieve beneficial effects. Those skilled in the art can understand and implement other variations of the disclosed embodiments after studying the accompanying drawings, the specification and claims. In the claims, the term "comprise" does not exclude other structures; the number relates to "a" but does not exclude more than one; and the terms "first", "second" are used to designate names rather than to indicate any particular order. Any reference numeral in the claims should not be construed as limiting the scope of protection. The presence of certain technical features in different dependent claims does not indicate that these technical features cannot be combined to achieve beneficial effects.

What is claimed is:

1. A display panel comprising:

at least two partitions, at least two first power supply voltage signal lines, and at least two first initialization signal lines, each of the at least two partitions comprising at least one sub-pixel, and the at least one sub-pixel comprising a light-emitting element; and first initialization signal lines of the at least two first initialization signal lines connected to first electrodes of light-emitting elements in at least two different partitions of the at least two partitions, second electrodes of the light-emitting elements in the at least two partitions being insulated from each other, the at least two first power supply voltage signal lines connected to the second electrodes of the light-emitting elements in the at least two different partitions, each first initialization signal line being configured to transmit a first initialization signal for initializing the first electrode of the light-emitting element, each first power supply voltage signal line being configured to transmit a first power supply voltage signal, for any i-th partition in the display panel, a voltage value of the first initialization signal transmitted by the first initialization signal line correspondingly connected to the i-th partition is determined according to a voltage value of the first power supply voltage signal transmitted by the first power supply voltage signal line correspondingly connected to the i-th partition and a preset initial cross-voltage value, the initial cross-voltage value is a voltage difference between the voltage value of the first initialization signal and the voltage value of the first power supply voltage signal, and i is a positive integer, different partitions correspond to a same initial cross-voltage value and the initial cross-voltage value is greater than 0 V.

2. The display panel according to claim 1, wherein the at least two partitions further comprise:

a first partition, the first power supply voltage signal line correspondingly connected to the first partition is configured to provide a negative power supply voltage signal with a first voltage value, and the first initialization signal line correspondingly connected to the first partition is configured to provide a first initialization signal with a second voltage value; and a second partition, the first power supply voltage signal line correspondingly connected to the second partition is configured to a negative power supply voltage signal with a third voltage value, and the first initialization signal line correspondingly connected to the second partition is configured to a first initialization signal with a fourth voltage value, and the first voltage value is different from the third voltage value, and the second voltage value is different from the fourth voltage value.

3. The display panel according to claim 2, wherein a difference between the first voltage value and the second voltage value is a first difference, a difference between the third voltage value and the fourth voltage value is a second difference, and a difference between the first difference and the second difference is less than a preset threshold.

4. The display panel according to claim 1, wherein the first electrodes of the light-emitting elements in a same partition are connected to a same first initialization signal line, and the second electrodes of the light-emitting elements in a same partition are connected to a same power supply voltage signal line.

5. The display panel according to claim 1, wherein the display panel further comprises:

a display area, the at least two first initialization signal lines comprise a first sub-initialization signal line located in the display area; and a non-display area, the first initialization signal line of the at least two first initialization signal lines comprises:

a first sub-initialization signal line located in the display area and a second sub-initialization signal line located in the non-display area, first sub-initialization signal lines connected to the first electrodes of the light-emitting elements in at least two of the partitions are different, and different first sub-initialization signal lines are connected to different second sub-initialization signal lines.

6. The display panel according to claim 5, wherein the first sub-initialization signal line connected to the first electrodes of the light-emitting elements in a same partition further comprises:

a first wiring portion extending along a first direction; and a second wiring portion extending along a second direction, and the first wiring portion is electrically connected to the second wiring portion.

7. The display panel according to claim 6, wherein the first sub-initialization signal line connected to the first electrodes of the light-emitting elements in a same partition comprises:

a plurality of first wiring portions and a plurality of second wiring portions, and the plurality of first wiring portions and the plurality of second wiring portions are cross-connected to form a mesh structure.

8. The display panel according to claim 7, wherein, along a thickness direction of the display panel, an area formed by an orthographic projection of the mesh structure comprises the first electrodes of N of the light-emitting elements in a corresponding partition of the at least two partitions, $1 \leq N \leq M$, M represents a number of the light-emitting elements in the corresponding partition of the mesh structure, and N and M are both positive integers.

9. The display panel according to claim 6, wherein the first sub-initialization signal line connected to the first electrodes of the light-emitting elements in a same partition further comprises:

a plurality of first wiring portions and one second wiring portion, and the plurality of first wiring portions and the second wiring portion are connected to form a comb-like structure having a comb handle and at least two comb teeth.

10. The display panel according to claim 6, wherein, along a thickness direction of the display panel, the display panel further comprises;

a substrate;

a first metal layer;

a second metal layer;

a third metal layer;

a fourth metal layer; and an insulation layer located between any adjacent metal layers, one of the first wiring portion and the second wiring portion is located in the second metal layer, and the other is located in the third metal layer or the fourth metal layer, and the first wiring portion and the second wiring portion are located in the display area.

11. The display panel according to claim 5, wherein the display panel further comprises:

a plurality of first bonding pads, different second sub-initialization signal lines are connected to different first bonding pads of the plurality of first bonding pads, the different first bonding pads are electrically connected to different first initialization signal output ends of a driving module, and the first initialization signal output end is configured to provide the first initialization signal.

12. The display panel according to claim 11, wherein the non-display area further comprises:

a first non-display area and a second non-display area that are opposite to each other, the first non-display area, the display area and the second non-display area are arranged in sequence along a column direction of the display panel, and the first bonding pads are located in the second non-display area and electrically connected to the first initialization signal output ends of the driving module; and a third non-display area and a fourth non-display area that are opposite to each other, the third non-display area, the display area and the fourth non-display area are arranged in sequence along a row direction of the display panel, the column direction intersects the row direction, and the second sub-initialization signal lines are located in the third non-display area or the fourth non-display area and extend to the first bonding pads.

13. The display panel according to claim 1, further comprising:

a first scanning signal line;

a second scanning signal line; and a second initialization signal line, wherein each sub-pixel further comprises a pixel circuit electrically connected to the first electrode of the light-emitting element, and the pixel circuit comprises:

a first driving module;

a first initialization module, a control end of the first initialization module being electrically connected to the first scanning signal line, a first end of the first initialization module being electrically connected to the first initialization signal line, and a second end of the first initialization module being electrically connected to the first electrode of the light-emitting element; and a second initialization module, a control end of the second initialization module being electrically connected to the second scanning signal line, a first end of the second initialization module being electrically connected to the second initialization signal line, a second end of the second initialization module being electrically connected to a control end of the first driving module, and the second initialization module being configured to transmit a second initialization signal of the second initialization signal line to the control end of the first driving module to initialize the control end of the first driving module, the second initialization signal line either reuses the first initialization signal line, or the second initialization signal line connected to the pixel circuits in at least two of the partitions is different from the first initialization signal line.

14. The display panel according to claim 1, wherein the first power supply voltage signal is a negative power supply voltage signal.

15. A method for driving a display panel, applicable to the display panel according to claim 1, the method further comprising:

providing different first initialization signals to the first electrodes of the light-emitting elements in at least two of the partitions through at least two first initialization signal lines; and providing different first power supply voltage signals to the second electrodes of the light-emitting elements in at least two of the partitions through at least two first power supply voltage signal lines, the initial cross-voltage value being a voltage difference between the voltage value of the first initialization signal and the voltage value of the first power supply voltage signal; different partitions correspond to a same initial cross-voltage value; and the initial cross-voltage value is greater than 0 V.

16. The method according to claim 15, wherein providing different first initialization signals to the first electrodes of the light-emitting elements in at least two of the partitions through the at least two first initialization signal lines further comprises:

acquiring, for any i-th partition in the display panel, a voltage value of the first power supply voltage signal provided to the i-th partition and the preset initial cross-voltage value, and i being a positive integer;

determining, according to the voltage value of the first power supply voltage signal corresponding to the i-th partition and the preset initial cross-voltage value, a voltage value of the first initialization signal transmitted by the first initialization signal line correspondingly connected to the i-th partition, and providing, based on the determined voltage value of the first initialization signal transmitted by the first initialization signal line correspondingly connected to the i-th partition, the first initialization signal with the determined voltage value to the first initialization signal line correspondingly connected to the i-th partition.

17. A display panel comprising:

at least two partitions, wherein each partition of the at least two partitions comprises at least one sub-pixel having a light-emitting element;

at least two first power supply voltage signal lines, and at least two first initialization signal lines, wherein each first initialization signal line of the at least two first initialization signal lines is connected to first electrodes of light-emitting elements in at least two different partitions of the at least two partitions, second electrodes of light-emitting elements in the at least two different partitions being insulated from each other, each first power supply voltage signal line of the at least two first power supply voltage signal lines connected to the second electrodes of the light-emitting elements in the at least two different partitions;

a display area, wherein each first initialization signal line of the at least two first initialization signal lines comprises a first sub-initialization signal line located in the display area; and a non-display area, wherein each first initialization signal line of the at least two first initialization signal lines comprises a second sub-initialization signal line located in the non-display area, first sub-initialization signal lines connected to the first electrodes of the light-emitting elements in at least two of the partitions are different, and different first sub-initialization signal lines are connected to different second sub-initialization signal lines, each first initialization signal line is configured to transmit a first initialization signal for initializing each first electrode of the light-emitting element, each first power supply voltage signal line is configured to transmit a first power supply voltage signal, the first sub-initialization signal line connected to the first electrodes of the light-emitting elements in a same partition comprises a plurality of first wiring portions and a plurality of second wiring portions, the plurality of first wiring portions and the plurality of second wiring portions are cross-connected to form a mesh structure, along a thickness direction of the display panel, an area formed by an orthographic projection of the mesh structure comprises the first electrodes of N of the light-emitting elements in a corresponding one of the partitions, $1 \leq N \leq M$, M represents a number of the light-emitting elements in the corresponding partition of the mesh structure, and N and M are both positive integers.

18. The display panel of claim 17, wherein the plurality of second wiring portions is arranged spaced apart from each other along a first direction.

19. The display panel of claim 17, wherein the first wiring portion extending along a first direction; and the second wiring portion extending along a second direction, and the first wiring portion is electrically connected to the second wiring portion.

20. The display panel of claim 17, wherein along a thickness direction of the display panel, the display panel further comprises:

a substrate;

a first metal layer;

a second metal layer;

a third metal layer;

a fourth metal layer; and an insulation layer located between any adjacent two of the metal layers, and one of the first wiring portion and the second wiring portion is located in the second metal layer, and the other is located in the third metal layer or the fourth metal layer, and the first wiring portion and the second wiring portion are located in the display area.

* * * * *